LAP-JOINING RECORDING TAPE SPLICER

Filed Dec. 20, 1971

United States Patent Office
3,826,705
Patented July 30, 1974

3,826,705

LAP-JOINING RECORDING TAPE SPLICER

Laurence L. Funk, Washington, D.C.
(711 Eno St., Hillsborough, N.C. 27278)

Filed Dec. 20, 1971, Ser. No. 209,824
Int. Cl. B31f 5/00
U.S. Cl. 156—505 1 Claim

ABSTRACT OF THE DISCLOSURE

A device with which to splice long-playing magnetic sound recording tape without the use of pressure-sensitive splicing tape. The recording tape is lap-joined with a liquid acrylic solvent, and is prevented from curling into a useless shape while under the influence of the solvent by a channel which directs the tape over a pressure-sensitive surface.

DESCRIPTION OF THE INVENTION

This invention relates to a method of splicing long-playing recording magnetic tape by chemically welding the tape in a lap joint, and more specifically, to an apparatus which performs this function, designed for private use by owners of entertainment tape recording/playback machines.

The recent use of extremely thin, narrow sound tape in long-playing Norelco (North American Phillips Co.)-licensed casettes has made desirable a better method of splicing home entertainment sound tapes than the present universal use of splicing tape. This latter method can cause one of two problems: when placed on the smooth, or base side of the recording tape, the splicing tape can jam against the felt head pressure pad, causing arrest. If it is placed on the oxide surface, diminuation of signal results. Furthermore, in the event the splice is improperly trimmed, the splice can jam on any one of the several guide members within the casette or mounted on the record/playback or bias signal heads. Still further, the splice can jam on an internally mounted anti-static foil, if the casette is so equipped. The use of splicing tape does not present any significant difficulties with ¼″ reel-to-reel recording tapes, but the casette, with its low-threshold manual override friction drive system, presents enough problems to justify this new method of splicing.

Figure 1:
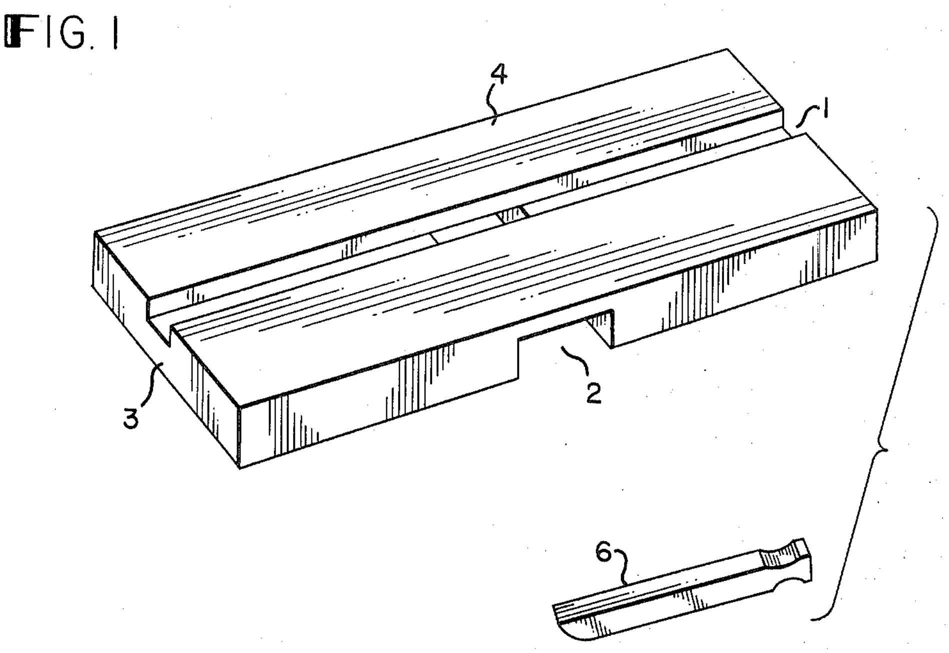
Figure 2:
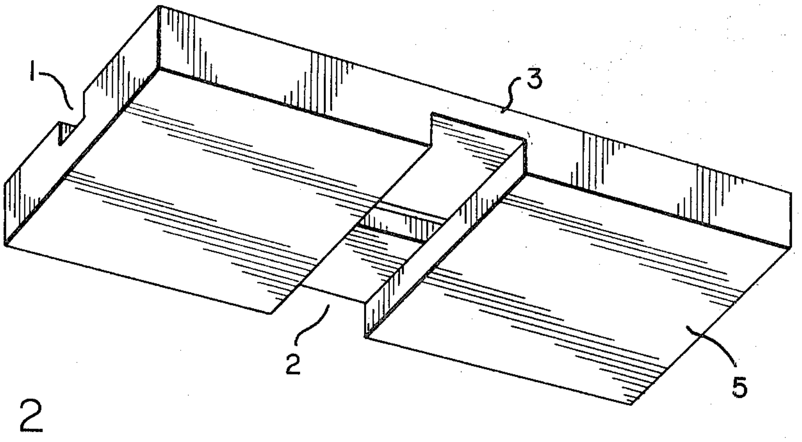

On the drawing page, FIG. 1 is a view of the top side of the splicing block, and FIG. 2 is a view of the bottom side of the splicing block.

The principal features of this device are two channels, 1 and 2, running perpendicularly to each other on opposing faces, 4 and 5, of a rigid, nonferrous block, 3, which is insoluble to the liquid which is employed in making the lap weld between the two severed ends of sound tape. The bottoms of 1 and 2 in their area of intersection are the same, i.e., the channel bottoms cause a hole, rectangular in shape, of width equal to the width of 1, by length equal to the width of 2, in the center of 3. 1 is as wide as the recording tape, and 2 is as wide as the pressure sensitive tape. In the bottom of 1 the sound tape is placed, and in the bottom of 2 a pressure-sensitive tape segment is adhered by its own adhesion. (One tape that works well in this application is 3M "Scotch" brand #600.)

The feature that makes this invention novel compared to existing splicers is the use of the pressure-sensitive tape to retain the recording tape's shape while a solvent liquid glue is being applied to it to form a lap weld. Without this support, the sound tape would curl, and would be ruined.

A tool, 6, with a beveled edge is used to secure the recording tape to the pressure-sensitive tape.

USE OF THE APPARATUS

Pressure-sensitive tape is adhered to the bottom of 2 by its own adhesion. 5 represents the bottom of the splicer during the splicing operation. The two ends of sound tape are placed in the bottom of 1, which aligns the two sections of tape so that their major axes coincide, so that they overlap by approximately ⅛″, and at this point are firmly secured to the pressure-sensitive tape by 6. It is unimportant whether the oxide surface faces up or down as the tape lies in 1. A small amount of solvent (about $\frac{1}{20}$ of a drop) is applied to the visible cut end of the sound tape, by use of a dropper, brush or burnished glass rod. The solvent does two things: it bonds the tape to itself, and also rounds off the edges of the cut, making the splice much more smooth than conventional ones. About two minutes are allowed to pass before peeling the recording tape from the pressure-sensitive tape to permit the weld to cure.

What I claim as my invention is:

1. A splicing block for magnetic recording tape comprising: a block having means defining a channel in one face thereof having a width at the base thereof which is substantially equal to the width of the magnetic recording tape to be spliced; said block further having means defining a recess in an opposite face thereof, said recess being wider than said channel and having a base which is coincident with the channel base to define an opening communicating the channel with the recess intermediate the length of the channel, and thereby defining on said recess base two surface portions laterally bordering said opening; said surface portions being constructed and arranged to have a piece of pressure-sensitive adhesive tape removably secured thereon so said adhesive tape spans the opening with the adhesive thereof facing the same direction as said block one face.

References Cited

UNITED STATES PATENTS

| | | | |
|---|---|---|---|
| 2,789,620 | 4/1957 | Vano | 156—506 |
| 3,075,572 | 1/1963 | Catozzo | 156—505 |
| 3,607,571 | 9/1971 | Tange | 156—505 |
| 3,694,294 | 9/1972 | Cafiero | 156—507 |

WILLIAM A. POWELL, Primary Examiner

U.S. Cl. X.R.

156—157, 545